(No Model.)
T. L. JOHNSON.
HINGED PAN FOR PROTECTING ELECTRIC MOTORS FOR CARS.
No. 416,366. Patented Dec. 3, 1889.
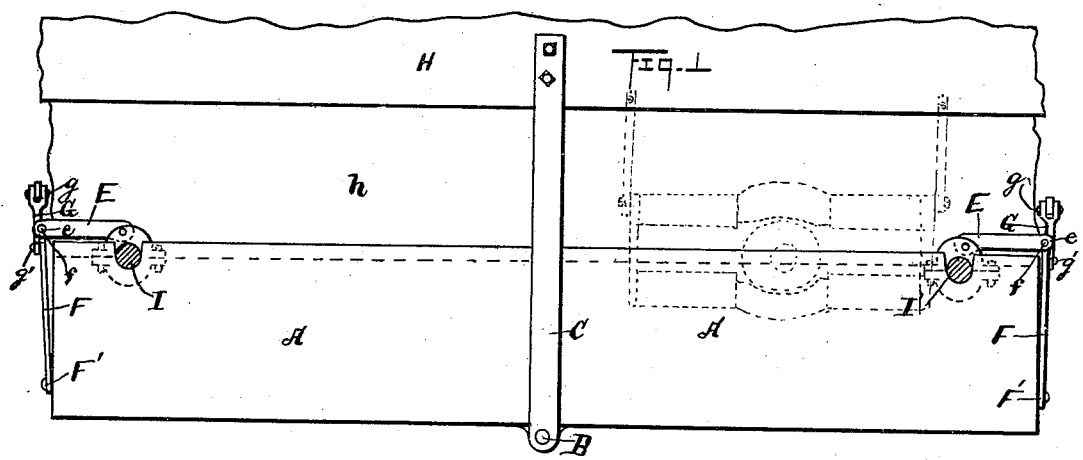
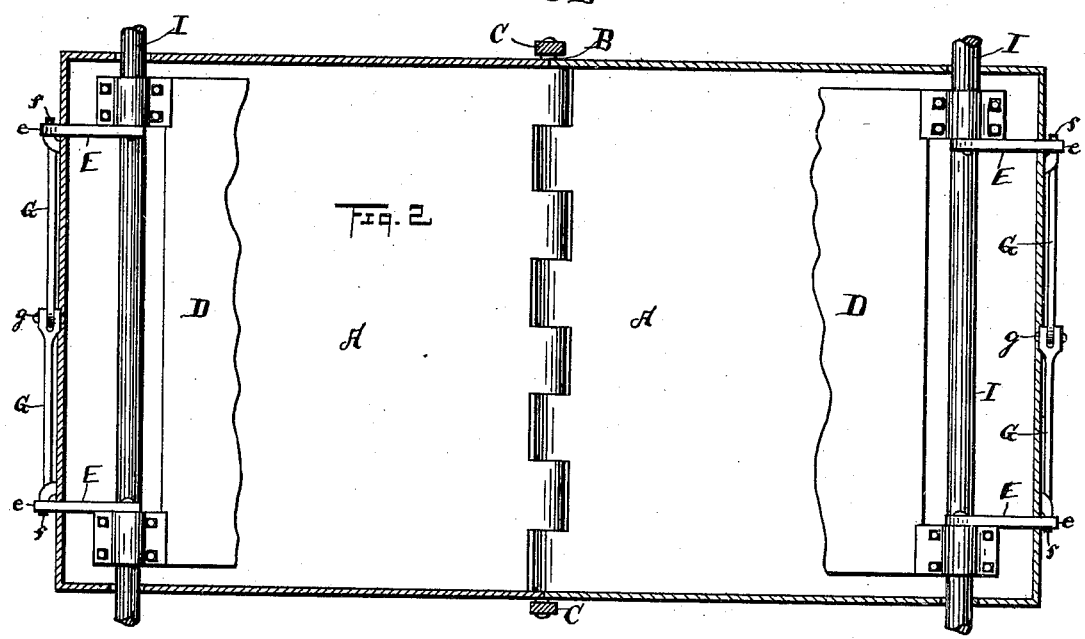
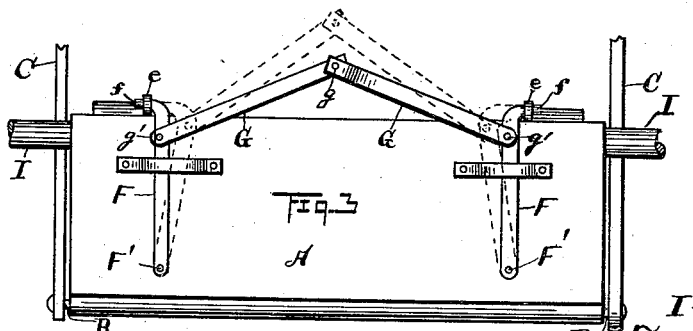
Witnesses
B. S. Lowrie
Geo. W. King
Inventor
Tom L. Johnson
By Leggett and Leggett
Attorneys

UNITED STATES PATENT OFFICE.

TOM L. JOHNSON, OF CLEVELAND, OHIO.

HINGED PAN FOR PROTECTING ELECTRIC MOTORS FOR CARS.

SPECIFICATION forming part of Letters Patent No. 416,366, dated December 3, 1889.

Application filed July 29, 1889. Serial No. 319,011. (No model.)

*To all whom it may concern:*

Be it known that I, TOM L. JOHNSON, of Cleveland, in the county of Cuyahoga and State of Ohio, have invented certain new and useful Improvements in Hinged Pans for Protecting Electric Motors on Street-Cars; and I do hereby declare the following to be a full, clear, and exact description of the invention, such as will enable others skilled in the art to which it pertains to make and use the same.

My invention relates to an improved hinged pan for protecting electric motors on street-cars; and it consists in certain features of construction, and in combination of parts hereinafter described, and pointed out in the claims.

Heretofore with electric motors on street-cars there has been great difficulty in protecting the motor from mud, dirt, water, &c., and at the same time having such protecting mechanism convenient for removal, whereby access could be had to the motor. For this purpose sheet-metal pans have been provided and bolted usually to the motor-frame or parts of the running-gear. To gain access to the sides and bottom of the motor, such pan had to be removed, and as the motor should be thoroughly cleaned at least once a day the removal and replacing of such unwieldy pan was a serious hinderance. I have therefore devised a hinged pan adapted to protect the motor, and that, when the motor-car is in position over a pit, can be unfastened at one end and allowed to turn down by gravity, whereby the motor is rendered accessible for cleaning, repairs, or other purposes, the fastening or unfastening of the pan requiring but a moment's time.

In the accompanying drawings, Figure 1 is a side elevation. Fig. 2 is a plan. Fig. 3 is an end elevation.

In the drawings double pans are shown hinged at the center, the same being adapted to accommodate two motors. In the case of a single motor, of course but one pan will be required.

A A represent the pans constructed preferably of sheet metal, the pans shown being hinged in common to rod B, the latter being supported by straps C, depending, for instance, from the motor-frame D. Bars E are secured to the motor-frame and project over the free ends of the pan, near the corners of the latter, for supporting the outer end of the pan.

F F are upright straps pivoted at F' to the end of the pan, near the bottom of the latter, the upper ends of these straps terminating in lateral pins $f$, adapted to engage lateral holes $e$ in supporting-bars E.

G G are arms pivoted together at $g$ and pivoted at $g'$ to the respective straps F, these arms constituting a toggle-joint. By elevating the toggles to the position shown in dotted lines straps F are made to approach each other, whereby pins $f$ are withdrawn from holes $e$, upon which the pan may be let down or allowed to fall by gravity. When the pan is in its normal or elevated position, by releasing the toggles pins $f$ are thrust into holes $e$ and firmly held, the straps F bearing against bars E, thereby preventing the possibility of accidental unfastening and preventing also any rattling of the parts.

H represents the body of the car, from which depends a canvass or curtain $h$, that for some inches overlaps the pan on the outside.

I represents the car-axle, having slots adapted to receive the same.

Where but one motor is used of course only one pan will be required. The double variety shown is for two motors, such as usually employed on street-cars.

What I claim is—

1. The combination, with an electric-motor car, of a hinged pan adapted to protect the bottom, sides, and ends of the motor, and suitable device for detachably securing the free end of the pan in its elevated position, substantially as set forth.

2. The combination, with an electric-motor car, of a pan adapted to protect such motor, such pan being hinged at the one end thereof, so as to tilt in a vertical plane, the free end of the pan having pivoted thereto upright straps, the same terminating in lateral pins adapted to engage holes in a supporting-bar, and toggle-joints connecting such upright straps, whereby the straps are distended or drawn toward each other by the elevation or depression of the toggles, substantially as set forth.

In testimony whereof I sign this specification, in the presence of two witnesses, this 24th day of June, 1889.

TOM L. JOHNSON.

Witnesses:
CHAS. H. DORER,
ALBERT E. LYNCH.